(12) United States Patent
Harada

(10) Patent No.: US 9,166,476 B2
(45) Date of Patent: Oct. 20, 2015

(54) CHARGE EXTRACTION CIRCUIT FOR VOLTAGE CONVERTER

(75) Inventor: Katsutomi Harada, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 282 days.

(21) Appl. No.: 13/636,138

(22) PCT Filed: Dec. 21, 2011

(86) PCT No.: PCT/JP2011/007179
§ 371 (c)(1),
(2), (4) Date: Sep. 20, 2012

(87) PCT Pub. No.: WO2012/090449
PCT Pub. Date: Jul. 5, 2012

(65) Prior Publication Data
US 2013/0162235 A1     Jun. 27, 2013

(30) Foreign Application Priority Data

Dec. 28, 2010  (JP) ................. 2010-292911

(51) Int. Cl.
*H02M 3/156* (2006.01)
*H02M 3/00* (2006.01)
*H02M 1/32* (2007.01)

(52) U.S. Cl.
CPC .............. *H02M 3/156* (2013.01); *H02M 3/00* (2013.01); *H02M 2001/322* (2013.01); *H02M 2003/1566* (2013.01); *Y04S 20/225* (2013.01)

(58) Field of Classification Search
CPC ............ H03J 1/00; H02M 1/12; H02M 1/15; H02M 3/06

USPC .......................................... 323/320, 282–284
See application file for complete search history.

(56) References Cited

U.S. PATENT DOCUMENTS 4,437,133 A * 3/1984 Rueckert .......................... 361/33
4,550,308 A * 10/1985 Tokura et al. .................. 341/167
(Continued)

FOREIGN PATENT DOCUMENTS

| JP | H09-238466 A | 9/1997 |
| JP | 2001-286128 A | 10/2001 |
| JP | 2005-044203 A | 2/2005 |
| JP | 2006-042576 A | 2/2006 |
| JP | 2007-288863 A | 11/2007 |

(Continued)

OTHER PUBLICATIONS

Search Report issued in corresponding International Application No. PCT/JP2011/007179 dated Mar. 19, 2012.

*Primary Examiner* — Harry Behm
*Assistant Examiner* — Peter Novak
(74) *Attorney, Agent, or Firm* — Morgan, Lewis & Bockius LLP

(57) ABSTRACT

A power supply circuit that includes a voltage conversion circuit (CONV) for outputting an output voltage to an output voltage terminal, the output voltage being stepped up or stepped down from an input voltage ($V_{IN}$) presented to an input voltage terminal, an output capacitor ($C_{OUT}$) coupled to the output voltage terminal, and a charge extraction circuit for extracting the charge of the output capacitor ($C_{OUT}$). Quick response to overshoot of $V_{OUT}$ generated by a sudden reduction in load current ($I_{LOAD}$) is afforded, and overshoot is minimized.

7 Claims, 17 Drawing Sheets

(56) References Cited

U.S. PATENT DOCUMENTS

| | | | |
|---|---|---|---|
| 6,784,647 B2 * | 8/2004 | Nguyen et al. | 323/282 |
| 6,984,967 B2 * | 1/2006 | Notman | 323/282 |
| 8,120,338 B2 | 2/2012 | Kawagishi et al. | |
| 2010/0007361 A1 * | 1/2010 | Yamanaka | 324/678 |

FOREIGN PATENT DOCUMENTS

| | | |
|---|---|---|
| JP | 2007-316811 A | 12/2007 |
| JP | 2009-146130 A | 7/2009 |
| JP | 2010-051073 A | 3/2010 |
| WO | WO 2008016050 A1 * | 2/2008 |

* cited by examiner

CHARGE EXTRACTION CIRCUIT FOR VOLTAGE CONVERTER

CROSS-REFERENCE TO RELATED APPLICATION

This application is the U.S. National Phase under 35 U.S.C. §371 of International Application PCT/JP2011/007179, filed on Dec. 21, 2011, which claims priority to JP Application No. 2010-292911, filed on Dec. 28, 2010, the contents of which are herein incorporated by reference in their entireties.

TECHNICAL FIELD

The present invention relates to a power supply circuit.

BACKGROUND ART

In accordance with a trend toward higher Large Scale Integration ("LSI") densities, the input voltages of LSIs are being lowered more and more. Therefore, the number of applications for generating low output voltages has increased for power supply circuits for outputting voltages to be input to LSIs. A conventional switching-type, step-down type power supply circuit is shown in FIG. 1. When a switching device SW1 is on, the inclination of a change in the current of an inductor L1 is represented by

[Expression 1]

$$\frac{dI_L}{dt} = \frac{V_{IN} - V_{OUT}}{L}. \quad (1)$$

In a case wherein an input voltage $V_{IN}$ to a power supply circuit is high while an output voltage $V_{OUT}$ is low, an inductor current $I_L$ rises sharply. For example, there may be a case wherein the input voltage $V_{IN}$ is 5 V, 12 V, 48 V, etc., and the output voltage $V_{OUT}$ is 1 V or lower. On the other hand, when the switching device SW1 is off, and a switching device SW2 is on, the inclination of the change in the current of the inductor L1 is represented by

[Expression 2]

$$\frac{dI_L}{dt} = -\frac{V_{OUT}}{L}, \quad (2)$$

and since the output voltage $V_{OUT}$ is low, the inductor current $I_L$ is reduced with a gentle inclination.

Assume a case of the occurrence of sudden reduction of a load current $I_{LOAD}$ that flows through a load, to which the output voltage $V_{OUT}$ of a step-down type power supply circuit using the above described inductor is applied. For example, when the inductor current $I_L$ is not reduced at the time that the load current $I_{LOAD}$ is dropped from 1 A to 100 mA, an extra charge is supplied to an output capacitor $C_{OUT}$, and causes overshoot, which is a rise in the output voltage $V_{OUT}$ that exceeds a predetermined threshold value. Even when the switching device SW1 is turned off, the inductor current $I_L$ is only gently reduced, as explained above in association with expression (2). Therefore, a capacitor having a large capacitance must be employed, so that the rise in the output voltage $V_{OUT}$ due to the inflow of the inductor current $I_L$ occurs only within a predetermined range. Here, the most sudden reduction in the load current $I_{LOAD}$ is a case wherein the load current $I_{LOAD}$ is reduced almost at the same time as when a circuit, such as an LSI, connected as a load, is turned off, and the least sudden reduction is a case wherein the load current $I_{LOAD}$ is reduced at least faster than the inductor current $I_L$ in expression (2). In this case, an extra charge is supplied to the output capacitor $C_{OUT}$, and overshoot may occur.

Further, when a series regulator, such as an LDO, is employed as a power supply circuit, the output voltage $V_{OUT}$ is increased in a case wherein the load current $I_{LOAD}$ is suddenly reduced, and a period wherein the output voltage $V_{OUT}$ is being increased is determined based only on the frequency range of the power supply circuit. However, when a power supply circuit is a switching regulator employing an inductor, upon the occurrence of a sudden reduction in the load current $I_{LOAD}$, a surplus current occurs in the inductor and an extra charge is supplied to the output capacitor $C_{OUT}$, so that a period in which the output voltage $V_{OUT}$ is being increased is extended until an extra charge has been consumed by the load, which especially becomes a problem.

A power supply circuit that can quickly respond to a reduction in a load current is disclosed in patent literature 1, and is shown in FIG. 2. A power supply circuit 1 includes a control circuit 10a and a converter 20a, which includes an output transistor Q1, which is an N-channel MOS transistor, a diode D1, a choke coil L1 and a smoothing capacitor C1. When the output transistor Q1 is turned on or off based on a signal SG1 output by the control circuit 10a, an input voltage $V_{IN}$ is stepped down, and a stepped-down voltage is output as an output voltage Vo to a load connected to an output terminal To. The output voltage Vo is adjusted to reflect a target value that is predetermined by changing a ratio of the ON time to the OFF time of the output transistor Q1.

The output terminal To is connected to an input terminal T1 of the control circuit 10a. The input terminal T1 is grounded via resistors R1 and R2. A junction point between the resistors R1 and R2 is connected to the inverting input terminal of a comparator 11, and with this arrangement, the output voltage Vo is divided by the resistors R1 and R2, and a divided voltage V1 is input as a feedback signal to the inverting input terminal of the comparator 11. The feedback signal is compared with a voltage reference Vr by the comparator 11, and based on the comparison results, the output transistor Q1 is turned on or off. According to this technique, in order to suppress low-frequency oscillation, which tends to occur in a case wherein the ON time or OFF time of a switching device is extremely extended, a voltage obtained by adding a slope signal to a reference voltage Vref is employed as the voltage reference Vr, which is used for comparison with the feedback signal. As a result, a period required after the load is suddenly changed until the output voltage Vo converges on the target value, based on the reference voltage Vref, can be reduced, and accordingly, the occurrence of overshoot can be suppressed. At this time, the reference voltage Vref is set, so that when the output voltage Vo reaches a standard value, the reference voltage Vref matches the divided voltage V1 obtained through the resistors R1 and R2.

A generally well known method for controlling a switching-type power supply circuit is a method for comparing the output voltage with a predetermined voltage, and for turning on a switching device in a case wherein the output voltage is equal to or lower than the predetermined voltage, and in addition, there are various specific control forms, including the prior art described in patent literature 1.

CITATION LIST

Patent Literature

PTL1: Japanese Patent Laid-Open No. 2010-051073

SUMMARY OF INVENTION

Technical Problem

However, according to the prior art for patent literature 1, only the control circuit 10a, which is a controller, is employed to suppress the occurrence of overshoot, and no consideration is given for the suppression of overshoot that can not be coped with merely by a controller and that will occur due to the reduction of a load current that is faster than the reduction of the inductor current $I_L$.

The present invention is provided while taking this problem into account, and the objective of the present invention is to provide a power supply circuit that can quickly respond to, and suppress, overshoot that has occurred due to a sharp reduction in a load current.

Solution to Problem

The present invention provides a power supply circuit that includes: a voltage conversion circuit for outputting to an output voltage terminal an output voltage stepped up or down from an input voltage applied to an input voltage terminal; an output capacitor coupled to the output voltage terminal; and a charge extraction circuit for extracting a charge from the output capacitor Further, it is preferable that the charge extraction circuit includes a first switching device between the output voltage terminal and a ground terminal. More preferably, the charge extraction circuit further includes a charge extraction portion coupled in series to the first switching device between the output voltage terminal and the ground terminal, wherein the charge extraction portion extracts the charge from the output capacitor when the first switching device is turned on.

Furthermore, preferably, the charge extraction portion consists of a resistor, and more preferably, consists of a parallel circuit including the resistor and a capacitor coupled in parallel to the resistor. Further, it is more preferable that the charge extraction portion further includes a second switching device coupled in parallel to the capacitor, wherein the second switching device is turned on when the first switching device is off. Moreover, it is more preferable that the charge extraction portion include a capacitor and a resistor, wherein one terminal of the resistor is coupled to a junction point of the capacitor and the first switching device; and wherein the other terminal of the resistor is coupled to the input voltage terminal or the ground terminal. In addition, it is more preferable for the charge extraction portion consists of a parallel circuit including a second switching device and a capacitor coupled in parallel to the second switching device, wherein the second switching device is turned on when the first switching device is off.

Here, the voltage conversion circuit preferably includes: a series circuit including a third switching device and an inductor, wherein one terminal of the third switching device is coupled to the input voltage terminal; and a fourth switching device, one terminal of which is coupled to a common junction point of the third switching device and the inductor; and more preferably, further includes: a fifth switching device coupled between the other terminal of the inductor and the output voltage terminal; and a sixth switching device coupled between the other terminal of the inductor and the input voltage terminal, wherein the fifth switching device is turned off when the first switching device is on and the sixth switching device is turned on when the first switching device is on.

Preferably, the first switching device is turned on when a voltage of the output voltage terminal becomes equal to or higher than a predetermined threshold value while the third switching device is off, and is turned off when the third switching device is shifted from the off state to the on state. Additionally, provided are: a first comparator, a non-inverting input terminal of which the output voltage terminal is coupled to, wherein an ON threshold value for the first switching device is input to an inverting input terminal of the first comparator; a second comparator, an inverting input terminal of which the output voltage terminal is coupled to, wherein an ON threshold value for the third switching device is input to a non-inverting input terminal of the second comparator; and an RS flip-flop, an output terminal of which is coupled to the first switching device, wherein an output of the first comparator is input to a set terminal of the RS flip-flop and an output of the second comparator is input to a reset terminal of the RS flip-flop.

Advantageous Effects of Invention

Since the power supply circuit of the present invention includes a charge extraction circuit for extracting a charge from the output capacitor, overshoot that has occurred due to a sudden reduction in a load current can be quickly responded to, and can be suppressed.

The other objectives, the features, the aspects and the advantages of the present invention will become more obvious in due course during the following detailed description presented with accompanying drawings.

DESCRIPTION OF EMBODIMENTS

Figure 1:
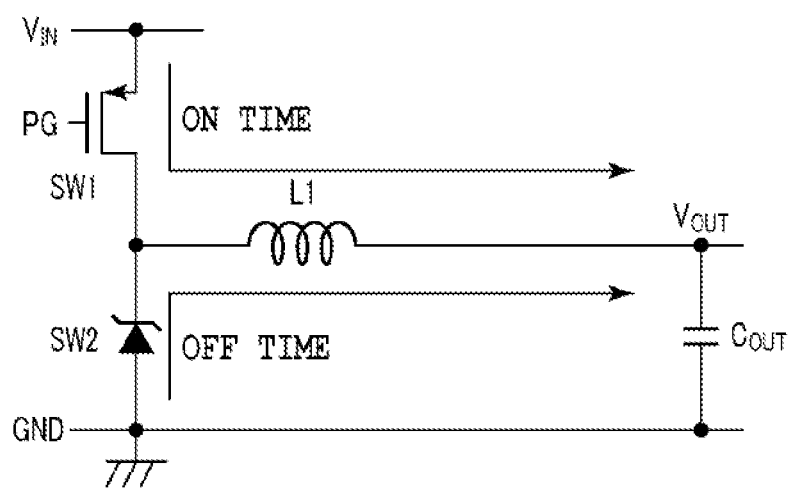
FIG. 1 is a diagram illustrating a conventional switching-type, step-down type power supply circuit.
Figure 2:
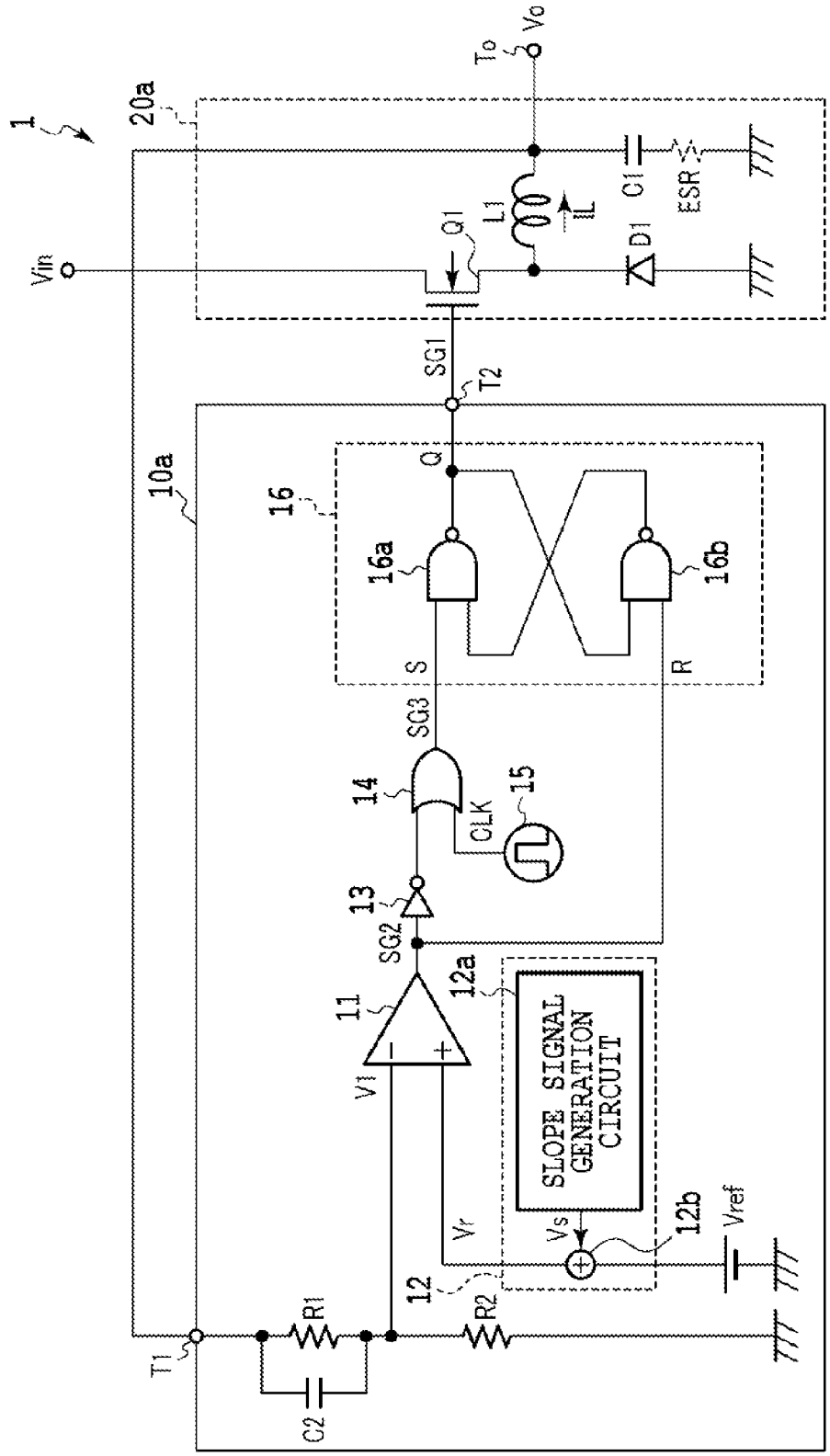
FIG. 2 is a diagram illustrating a conventional power supply circuit that can quickly respond to a reduction in a load current.

The embodiments of the present invention will now be described in detail while referring to the drawings.

Figure 3:
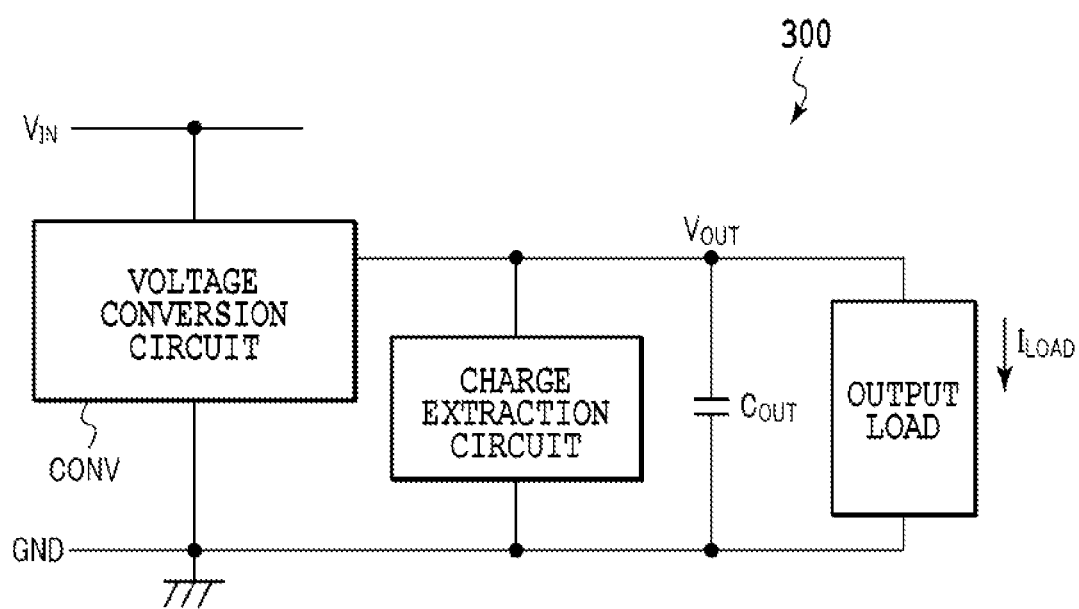
FIG. 3 is a diagram illustrating a power supply circuit according to the present invention.

FIG. 3 is a diagram illustrating the basic arrangement of a power supply circuit according to the present invention.

A power supply circuit 300 includes a voltage conversion circuit CONV, for outputting to an output voltage terminal an output voltage $V_{OUT}$ that is obtained based on an input voltage $V_{IN}$ applied to an input voltage terminal; an output capacitor $C_{OUT}$ coupled to the output voltage terminal; and a charge extraction circuit for extracting a charge from the output capacitor $C_{OUT}$.

The voltage conversion circuit CONV is provided by using a switching regulator which includes an inductor and a switching device, such as a DC-DC converter or an AC-DC converter, or a series regulator, such as an LDO. It should be noted here that the voltage conversion circuit CONV can have either a structure wherein the output voltage $V_{OUT}$, which is obtained by stepping up the input voltage $V_{IN}$ applied to the input voltage terminal, is to be output to the output voltage terminal, or a structure wherein the output voltage $V_{OUT}$, obtained by stepping down the input voltage $V_{IN}$, is to be output to the output voltage terminal.

The charge extraction circuit is a circuit that extracts a charge from the output capacitor $C_{OUT}$ upon the detection of overshoot that has occurred due to a sharp reduction in a load current, and various structures, as depicted in the following embodiments, can be employed.

According to the above described basic structure of the present invention that includes the charge extraction circuit, since the charge extraction circuit can extract a charge from the capacitor $C_{OUT}$, the rise of the output voltage $V_{OUT}$ can be suppressed.

First Embodiment

Figure 4:
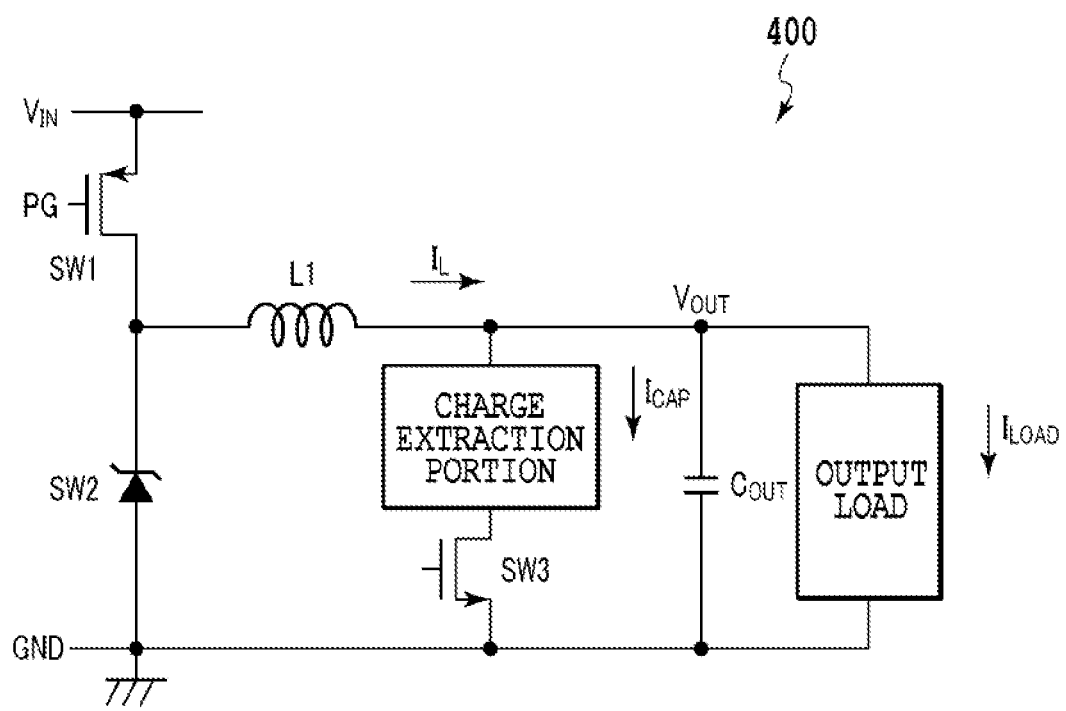
FIG. 4 is a diagram illustrating a power supply circuit according to a first embodiment.

A power supply circuit according to a first embodiment is shown in FIG. 4. A power supply circuit 400 includes: an inductor L1; a switching device SW1, coupled between an input voltage terminal, to which an input voltage $V_{IN}$ is applied, and the inductor L1; a switching device SW2 coupled between a junction point for the switching device SW1 and the inductor L1 and a ground terminal GND; an output capacitor $C_{OUT}$ arranged between an output voltage terminal, from which an output voltage $V_{OUT}$ is to be output, and the ground terminal GND; a charge extraction portion coupled, between the inductor L1 and the output voltage terminal, in parallel to the output capacitor $C_{OUT}$; and a switching device SW3 provided for the charge extraction portion.

For the power supply circuit 400, a charge extraction circuit is provided by coupling the charge extraction portion and the switching device SW3 in series between the output voltage terminal and the ground terminal. The charge extraction portion extracts surplus charge from the output capacitor $C_{OUT}$, and consumes electricity.

When overshoot is detected that has occurred due to a sudden reduction in a load current, the switching device SW3 is turned on. Therefore, the charge extraction portion extracts charge from the output capacitor $C_{OUT}$, and a rise in the output voltage $V_{OUT}$ can be suppressed. It should be noted that an extremely simple structure, wherein only the switching device SW3 is coupled between the output voltage terminal and the ground terminal, may be employed for the charge extraction circuit. In the following embodiment, a specific example for the charge extraction portion will be provided.

Second Embodiment

Figure 5:
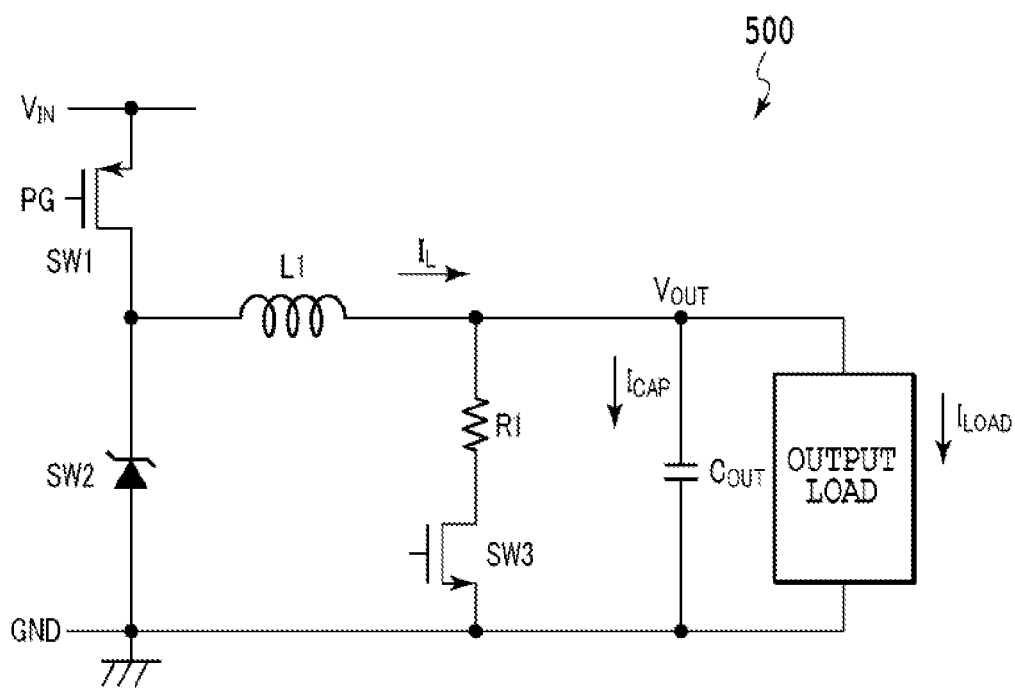
FIG. 5 is a diagram illustrating a power supply circuit according to a second embodiment.

A power supply circuit according to a second embodiment is shown in FIG. 5. For a power supply circuit 500, a resistor R1 is employed to provide a charge extraction circuit. When the occurrence of overshoot is detected that is a result of a rise in an output voltage $V_{OUT}$ that exceeds a threshold value that has been designated in advance, a switching device SW3 is turned on, and then a current flows through the resistor R1. This current serves as an alternative current used to compensate for the sudden reduction in the load current $I_{LOAD}$, and can be employed to suppress a current $I_{CAP}$ that is to be supplied to a capacitor $C_{OUT}$, and to halt the rise in the output voltage $V_{OUT}$.

Figures 6A, 6B:
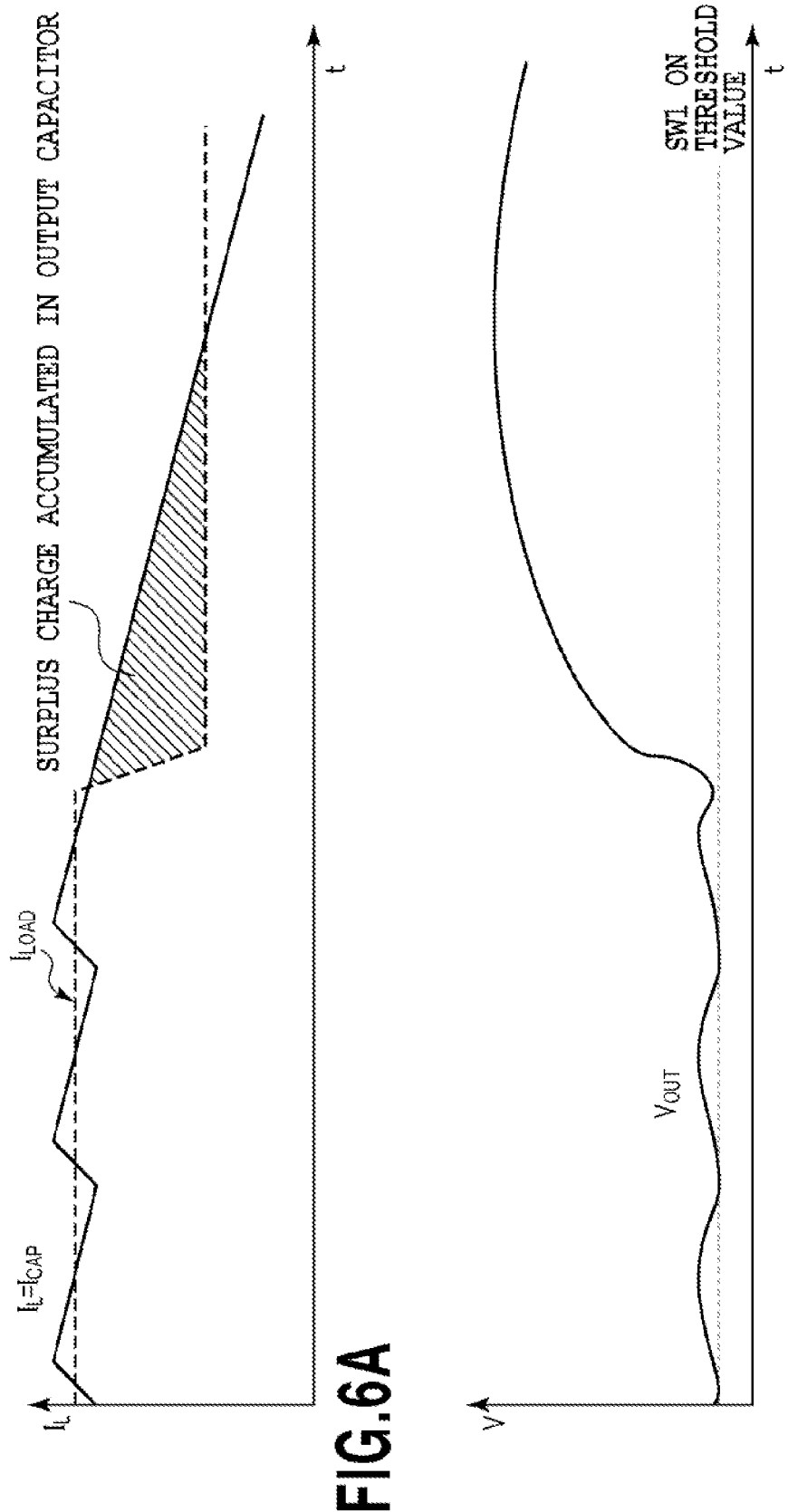
FIG. 6A is a diagram showing a change in a load current for the conventional power supply circuit in FIG. 1 that is used for a comparison of the operation.
FIG. 6B is a diagram showing the change of an output voltage for the conventional power supply circuit in FIG. 1 for a comparison of the operation.
Figure 7:
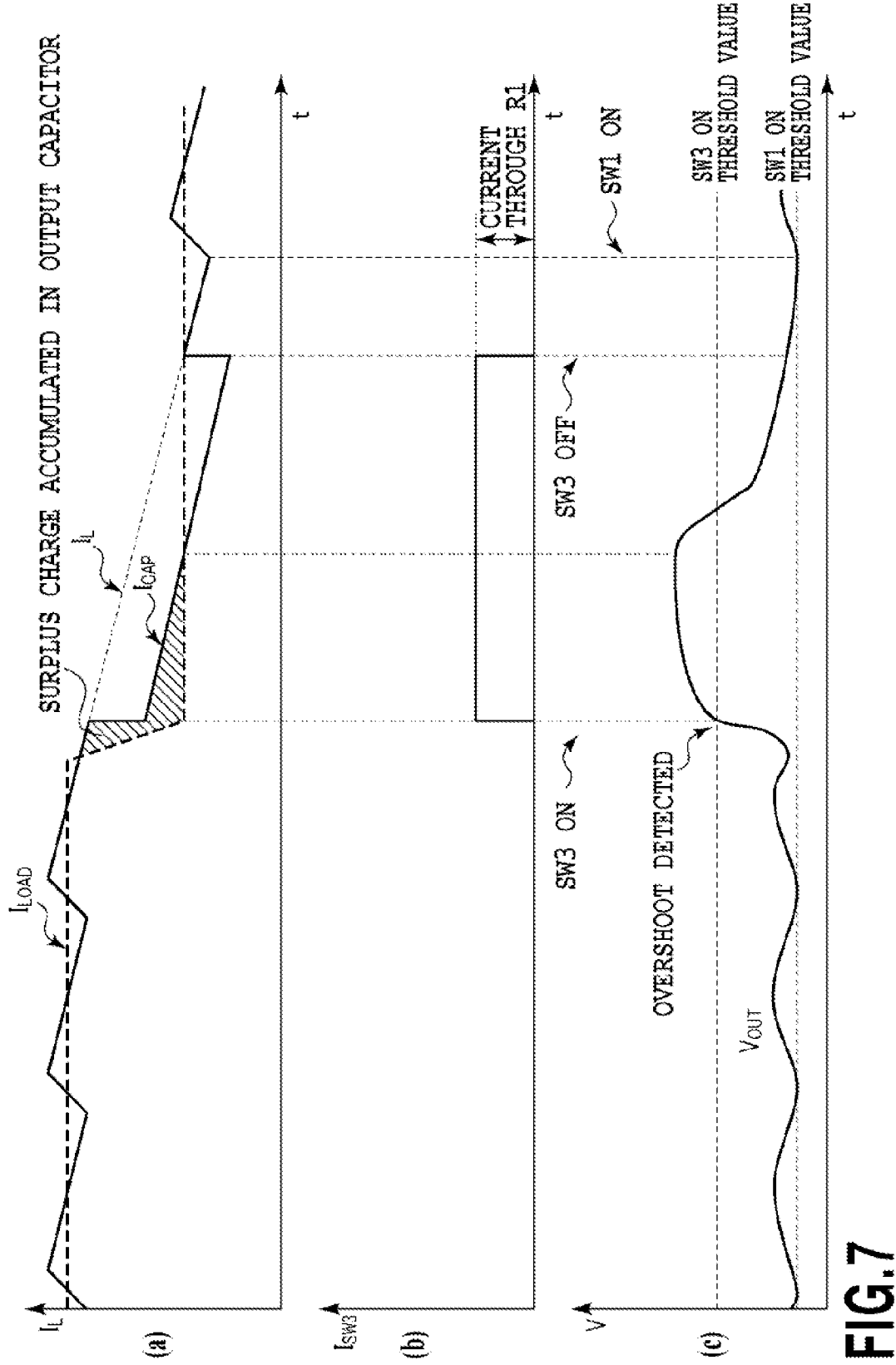
FIG. 7 is a diagram for explaining an example operation for the power supply circuit according to the second embodiment.

FIG. 7 is a diagram for explaining an example operation of the power supply circuit according to this embodiment. FIGS. 6A and 6B are diagrams for explaining the operation of the conventional power supply circuit shown in FIG. 1 as a comparison. A change in a load current for the power supply circuit is shown in FIG. 6A, and a change in an output voltage for the power supply circuit is shown in FIG. 6B.

The switching device SW1 is maintained on for a specified period of time, and is turned off and maintained in that state until the output voltage has been dropped to a reference voltage (the SW1 ON threshold value). When the output voltage has been reduced to the reference voltage, the switching device SW1 is again turned on and maintained in that state for a specified period of time. This is the control process that is performed. This procedure is employed in common for FIGS. 6A, 6B and 7. However, while referring to FIG. 7 for this embodiment, when overshoot that has occurred due to a sharp reduction in the load current $I_{LOAD}$ is detected, the switching device SW3 is turned on, an alternative current $I_{SW3}$ flows across the resistor R1 that is included in the charge extraction portion, and any surplus of the inductor current $I_L$ is consumed. The alternative current $I_{SW3}$ continuously reduces the occurrence of overshoot due to a surplus charge on the output capacitor, and disappears when the switching device SW3 is turned off.

Referring to FIG. 7, when the inductor current $I_L$ has been reduced to the level of the load current $I_{LOAD}$, the switching device SW3 is turned off, and thereafter, the switching device SW1 is turned on; however, when the output voltage $V_{OUT}$ has dropped to the reference voltage (the SW1 ON threshold value) level, the switching device SW3 may be turned off, and at the same time, the switching device SW1 may be turned on. Or, a method for turning off the switching device SW3 following a predetermined elapse of time may be employed. In either case, since upon the detection of the overshoot, any surplus charge is consumed by the resistor R1, which provides the charge extraction portion, the occurrence of overshoot can be suppressed.

For the power supply circuit 500, a time T required from the detection of overshoot until the extraction of surplus charge from the output capacitor $C_{OUT}$ has been determined, based on a time constant relative to the resistor R1 and the output capacitor $C_{OUT}$, and a ratio of the output voltage $V_{OUT}$ to the overshoot voltage, and is represented as

[Expression 3]

$$T = -R1 \times C_{OUT} \times l_n\left(\frac{V_{OUT}}{V_{OUT} + V_{OVER}}\right). \quad (3)$$

In Expression (3), R1 denotes the resistance of the resistor R1, $C_{OUT}$ denotes the capacitance of the output capacitor $C_{OUT}$, $V_{OUT}$ denotes the voltage value of the output voltage $V_{OUT}$, and $V_{OVER}$ denotes an overshoot voltage.

When R1=1Ω, $C_{OUT}$=20 μF, $V_{OUT}$=1 V and $V_{OVER}$=50 mV, T=0.975 μsec, and it is apparent that overshoot can be suppressed within a short period of time.

Further, referring to Expression (3), when the resistance of the resistor R1 and the capacitance of the output capacitor $C_{OUT}$ are smaller, overshoot can be suppressed in a shorter period of time.

That is, since the output voltage $V_{OUT}$ can be reduced further when the resistance of the resistor R1 and the capacitance of the output capacitor $C_{OUT}$ are smaller, the power supply circuit can be appropriately employed for an LSI that is operated at a low voltage of 1 V or less.

Furthermore, when the resistance of the resistor R1 and the capacitance of the output capacitor $C_{OUT}$ are smaller, the size of a mounting area can be reduced, while the suppression of overshoot is enabled.

Moreover, "bottom detection control", whereby the switching device SW1 is turned on when the output voltage $V_{OUT}$ has been dropped to the reference voltage level (the SW1 ON threshold value), has been employed as an example by referring to FIGS. 6A, 6B and 7; however, various operations for controlling the switching device SW1, such as hysteresis window control, peak detection control, constant-frequency peak-voltage control and constant-frequency valley-voltage control, are known, and it should be noted that, in a case wherein the arbitrary operation of any of them is employed, suppression of overshoot by the present invention is still enabled.

Third Embodiment

Figure 8:
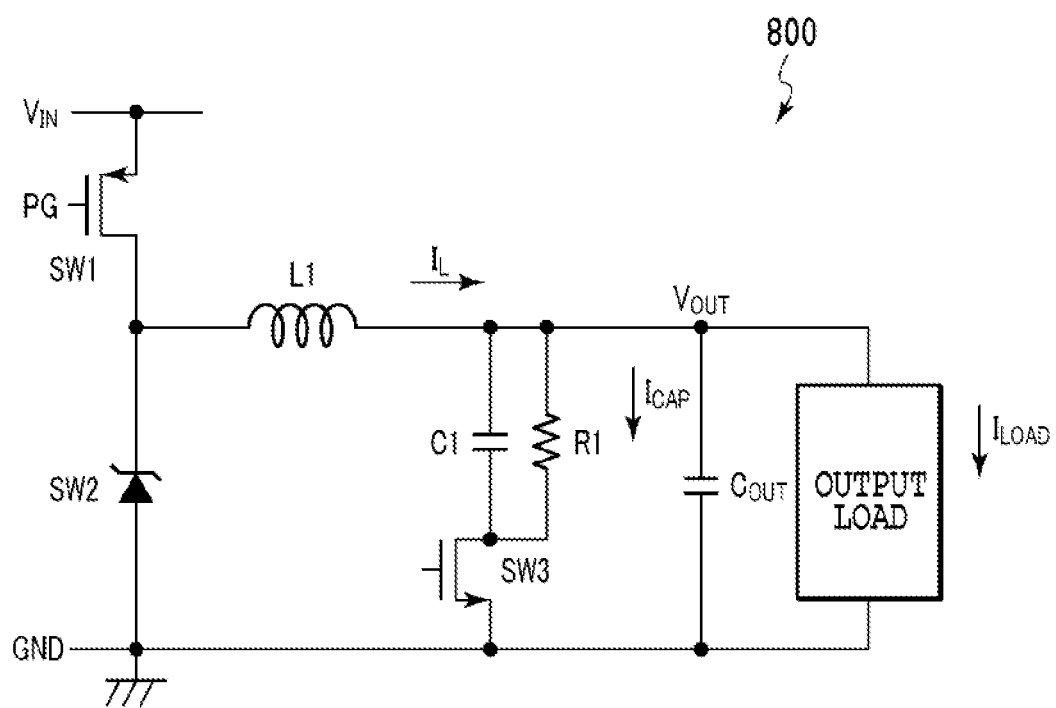
FIG. 8 is a diagram illustrating a power supply circuit according to a third embodiment.
Figure 9:
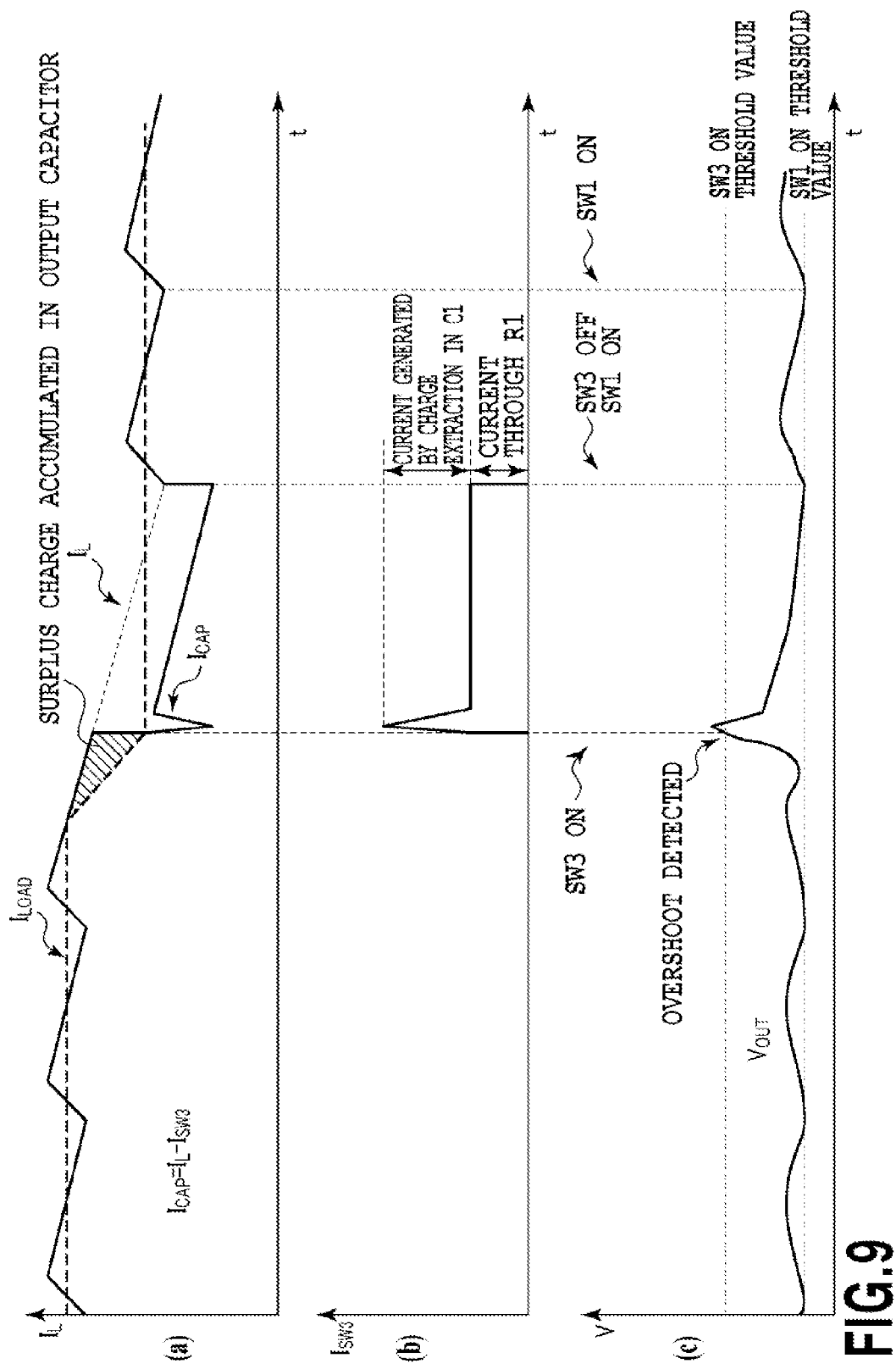
FIG. 9 is a diagram for explaining an example operation for the power supply circuit according to the third embodiment.

A power supply circuit according to a third embodiment is shown in FIG. 8. For a power supply circuit 800, a charge extraction portion is provided by using a parallel circuit that includes a resistor R1 and a capacitor C1, which are coupled in parallel. When overshoot is detected as a result of an increase in an output voltage $V_{OUT}$ that exceeds a threshold value designated in advance, a switching device SW3 is turned on, and a current flows through a resistor R1. This current serves as an alternative current used to compensate for a sudden reduction in a load current $I_{LOAD}$, and can be employed to suppress a current $I_{CAP}$, which is supplied to an output capacitor $C_{OUT}$, and to halt a rise in the output voltage $V_{OUT}$. In addition, when the switching device SW3 is turned on, the voltage of the capacitor C1 instantaneously reaches $V_{OUT}$, which is a level for the ON state of the switching device SW3, so that a charge Q1=C1×$V_{OUT}$ is extracted from the output capacitor $C_{OUT}$, and is supplied to the capacitor C1 of the parallel circuit. As a result, almost at the same time as the switching device SW3 is turned on, the output voltage $V_{OUT}$ is dropped at a ratio of Q1/$C_{OUT}$, and the occurrence of overshoot can be quickly suppressed. This state is shown in FIG. 9.

Fourth Embodiment

Figure 10:
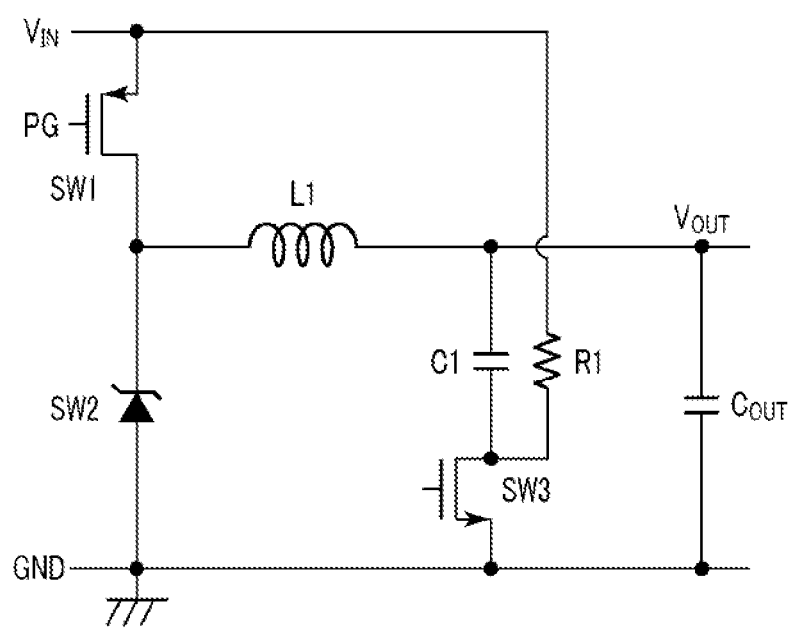
FIG. 10 is a diagram illustrating a power supply circuit according to a fourth embodiment.

A power supply circuit according to a fourth embodiment is shown in FIG. 10. For a power supply circuit 1000, a charge extraction portion is provided by using a capacitor C1 and a resistor R1, one terminal of which is coupled to a junction point of the capacitor C1 and a switching device SW3.

The quantity of electric charge, Q1, to be accumulated in the capacitor C1, is C1×($V_{IN}$-$V_{OUT}$), and an output voltage drop ratio for the capacitor C1, when a switching device SW3 is turned on, is Q1/$C_{OUT}$. This indicates that, under the condition where ($V_{IN}$-$V_{OUT}$)>$V_{OUT}$, a voltage drop can be greater than that in the third embodiment shown in FIG. 7. In other words, the capacitance required for the capacitor C1 can be reduced in order to obtain the same voltage drop. For the usage of a low output voltage, as described in the background, the above described condition is satisfied.

It should be noted that in FIG. 10 the resistor R1 is coupled to an input voltage terminal; however, an arbitrary voltage terminal, for applying a voltage V that satisfies (V-$V_{OUT}$)>$V_{OUT}$, can be employed.

Fifth Embodiment

Figure 11:
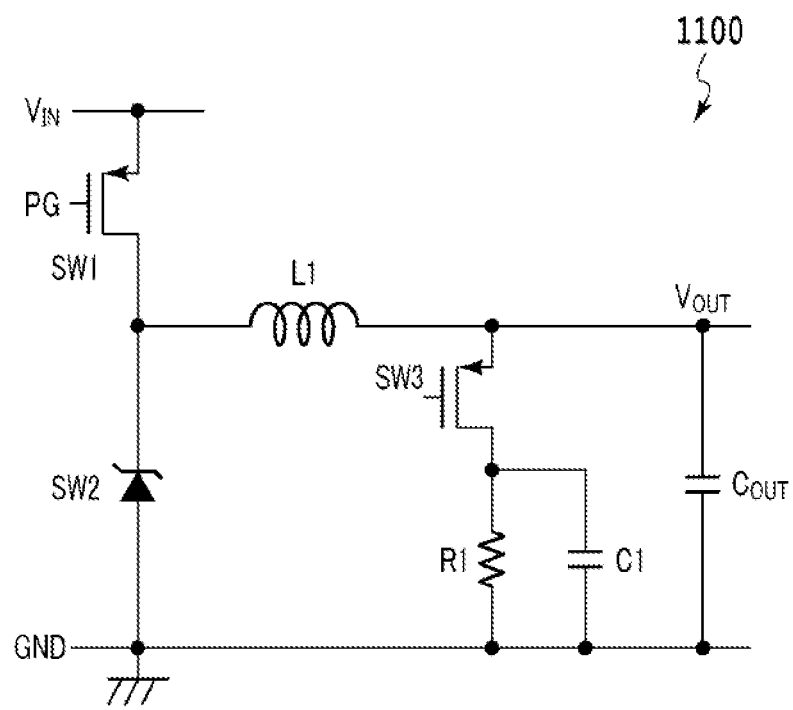
FIG. 11 is a diagram illustrating a power supply circuit according to a fifth embodiment.

A power supply circuit according to a fifth embodiment is shown in FIG. 11. As well as in the third embodiment, for a power supply circuit 1100, a charge extraction portion is provided by a parallel circuit that includes a resistor R1 and a capacitor C1 that are coupled in parallel, but a difference is that a switching device SW3 is arranged between the charge extraction portion and the junction point of an inductor L1 and an output voltage terminal. With this arrangement, since the capacitor C1 is coupled to a ground terminal GND, pre-charging of the capacitor C1 is not required. In the third embodiment, pre-charging for the capacitor C1 is required until the terminal on the side of the switching device SW3 reaches $V_{OUT}$ level.

Figure 12:
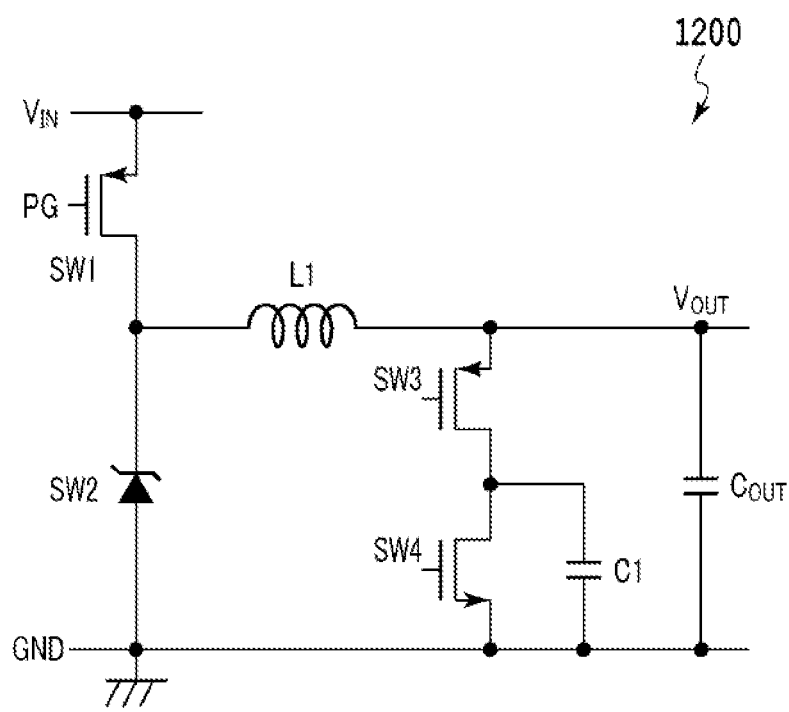
FIG. 12 is a diagram illustrating a modification for the power supply circuit according to the fifth embodiment.

A modification of the power supply circuit of the fifth embodiment is shown in FIG. 12. For a power supply circuit 1200, a switching device SW4 is employed instead of the resistor R1, which is included in a parallel circuit. With this arrangement, since a CR time constant for returning the voltage potential difference of the capacitor C1 to 0 V is eliminated, the ON/OFF operation of the switching device SW3 can be repetitively performed.

Both the resistor R1 and the switching device SW4 serve as discharge devices for discharging the capacitor C1 when the switching device SW3 is turned off.

Sixth Embodiment

Figure 13:
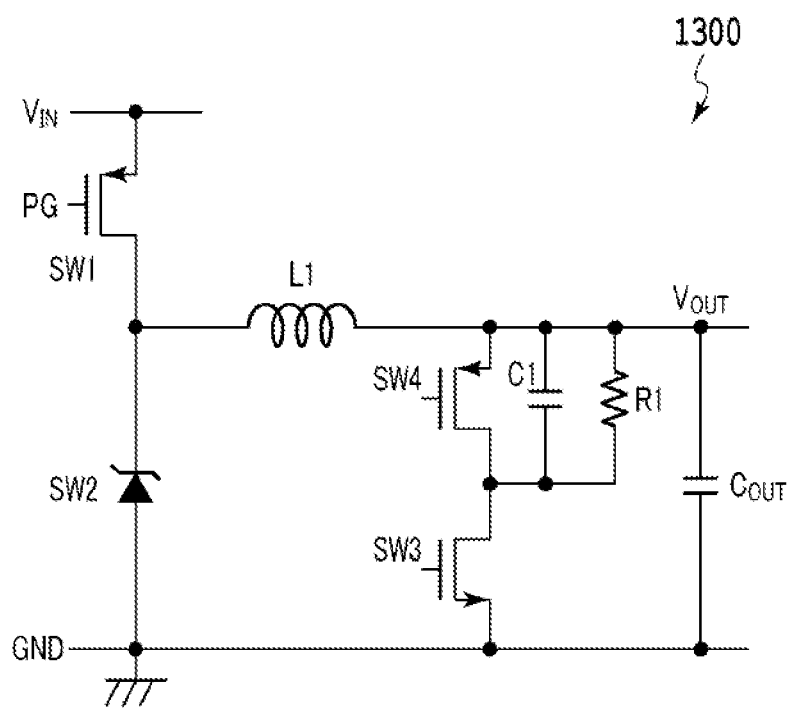
FIG. 13 is a diagram illustrating a power supply circuit according to a sixth embodiment.

A power supply circuit according to a sixth embodiment is shown in FIG. 13. As well as in the third embodiment, for a power supply circuit 1300, a charge extraction portion includes a parallel circuit provided by coupling a resistor R1 and a capacitor C1 in parallel, but a difference is that a switching device SW4 is also coupled in parallel to the parallel circuit. The switching device SW4 is turned off when the switching device SW3 is on, and the switching device SW4 is turned on when the switching device SW3 is off. When a charge stored in the capacitor C1 when the switching device SW3 was on is extracted through the switching device SW4, a time constant required for charging the capacitor C1 can be canceled, and a quick response is enabled for a repetitively continued overshoot.

It should be noted that, in a case wherein the charge extraction portion includes the switching device SW4, the structure wherein the resistor R1 is removed from the parallel circuit can still suppress overshoot.

Seventh Embodiment

Figure 14:
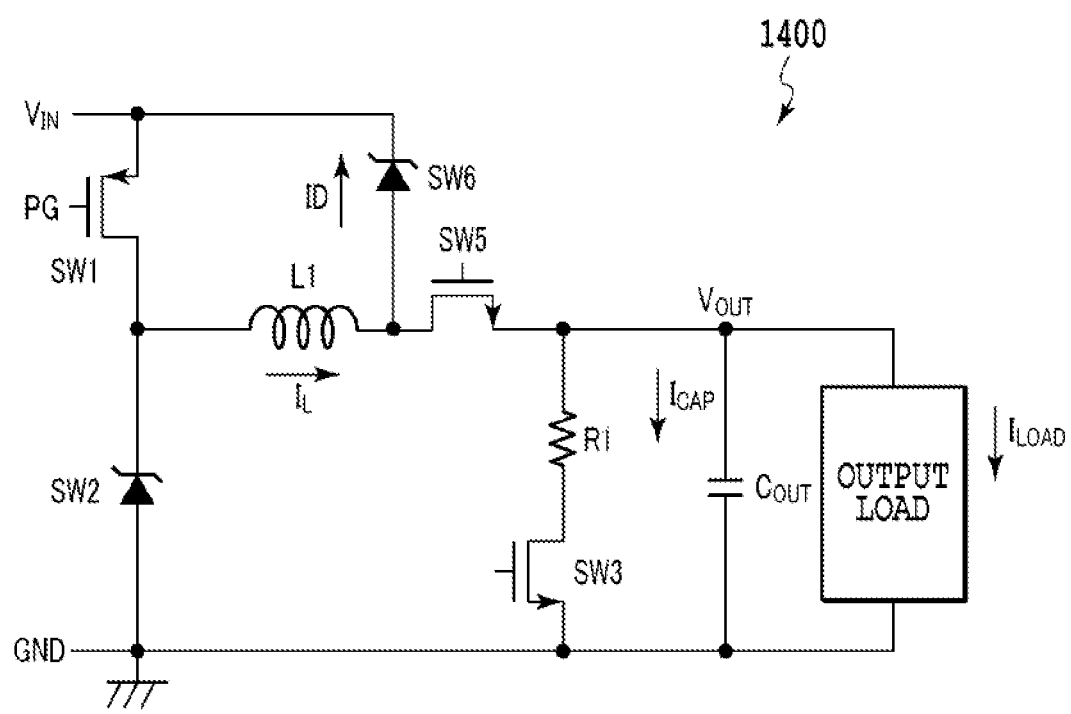
FIG. 14 is a diagram illustrating a power supply circuit according to a seventh embodiment.

A power supply circuit according to a seventh embodiment is shown in FIG. 14. A power supply circuit 1400 is a step-down type power supply circuit that includes: an inductor L1, a switching device SW1 coupled between an input voltage terminal, to which an input voltage $V_{IN}$ is to be applied, and the inductor L1; a switching device SW2 coupled between a junction point of the switching device SW1 and the inductor L1 and a ground terminal GND; an output capacitor $C_{OUT}$ arranged between an output voltage terminal, from which an output voltage $V_{OUT}$ is to be output, and the ground terminal GND; a charge extraction portion coupled between the inductor L1 and the output voltage terminal in parallel to the capacitor $C_{OUT}$; a switching device SW3 for the charge extraction portion; a switching device SW5 coupled between the inductor L1 and the output voltage terminal; and a switching device SW6 coupled between a junction point of the inductor L1 and the switching deice SW5 and an input voltage terminal. Similarly to the first embodiment, the charge extraction portion is provided by using the resistor R1; however, the structures employed for the charge extraction portions in the first through the sixth embodiments can be applied.

An input voltage $V_{IN}$ is applied to the inductor L1 by the switching device SW1, and energy is accumulated using a current that flows through the inductor L1. The current generated by this energy is supplied to the capacitor $C_{OUT}$ by the switching device SW2. The switching device SW5 is turned off when the switching device SW3 is on, and the switching device SW6 is turned on when the switching device SW3 is on.

With this arrangement, since there is very little overshoot, and a charge of the capacitor $C_{OUT}$ is extracted by the charge extraction portion, a rise in the output voltage $V_{OUT}$ can be quickly suppressed. Further, since a surplus current in the inductor L1 can be returned to the input voltage terminal, power loss can be reduced.

Figure 15:
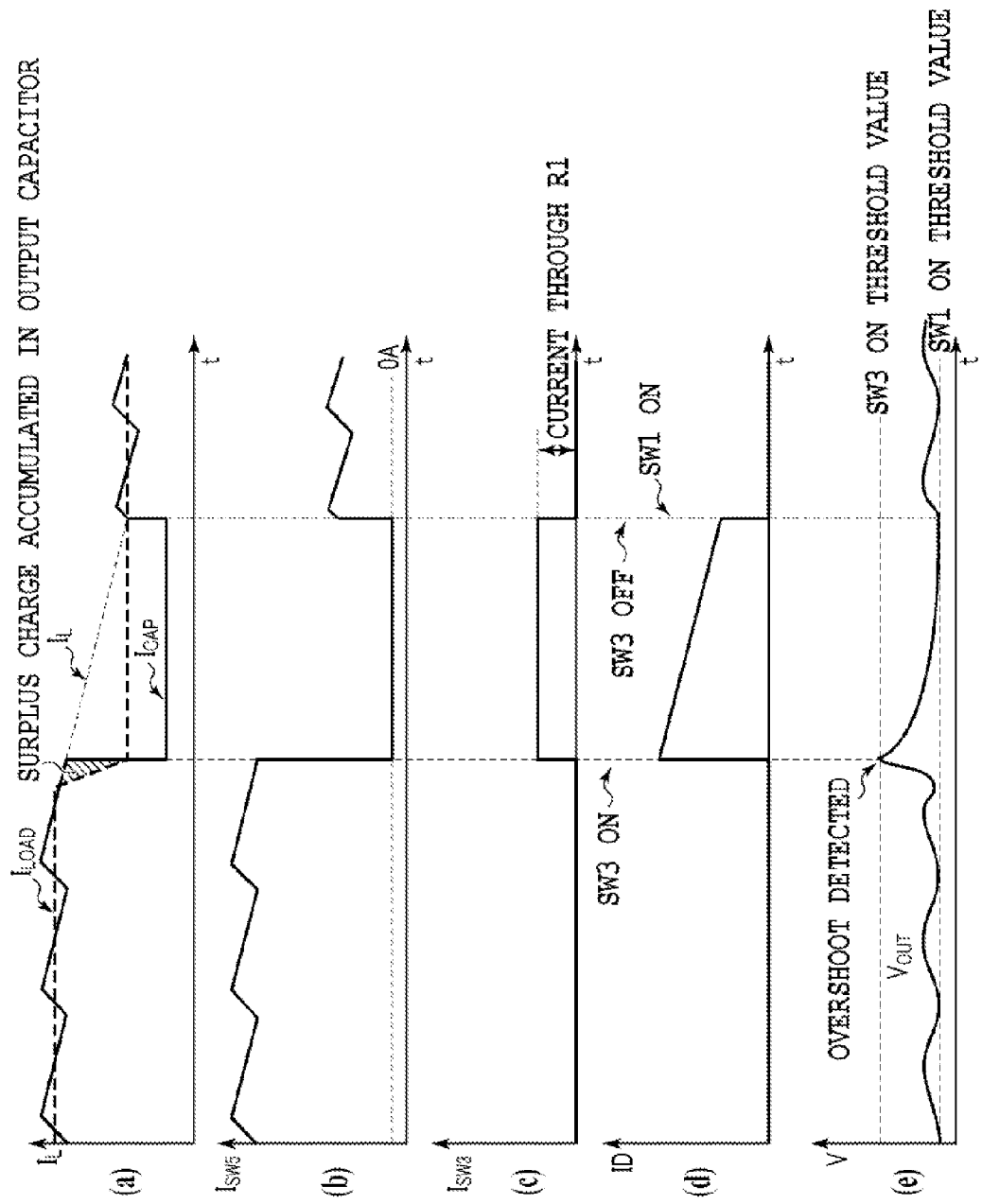
FIG. 15 is a diagram for explaining an example operation for the power supply circuit according to the seventh embodiment.

FIG. 15 is a diagram for explaining an example operation for a power supply circuit according to the seventh embodiment.

When the output voltage $V_{OUT}$ is increased to the reference voltage (the SW3 ON threshold value), due to the sudden reduction of a load current $I_{LOAD}$, and the switching device SW3 is turned on, the switching device SW5 is turned off, i.e., a current $I_{SW5}$ that flows through the switching device SW5 becomes zero, and a current value of a current $I_{CAP}$ supplied to an output capacitor $C_{OUT}$ is sharply reduced, while the increase in the output voltage $V_{OUT}$ is halted. Then, an alternative current $I_{SW3}$ flows from the output capacitor $C_{OUT}$ to the resistor R1, and thus, the increase of the output voltage $V_{OUT}$ is quickly suppressed. Further, when the switching device SW3 is turned on, the switching device SW6 is also turned on, and a current ID of the switching device SW6 becomes an inductor current $I_L$, which is then returned to the input voltage terminal. Thereafter, when the inductor current $I_L$ is reduced to a load current $I_{LOAD}$, and when the output voltage $V_{OUT}$ is dropped to the reference voltage (the SW1 ON threshold value), the switching device SW3 is turned off, and the switching device SW1 is turned on.

In this manner, the power supply circuit according to the seventh embodiment can quickly suppress a rise in the output voltage $V_{OUT}$, and can also reduce power loss.

Eighth Embodiment

Figure 16:
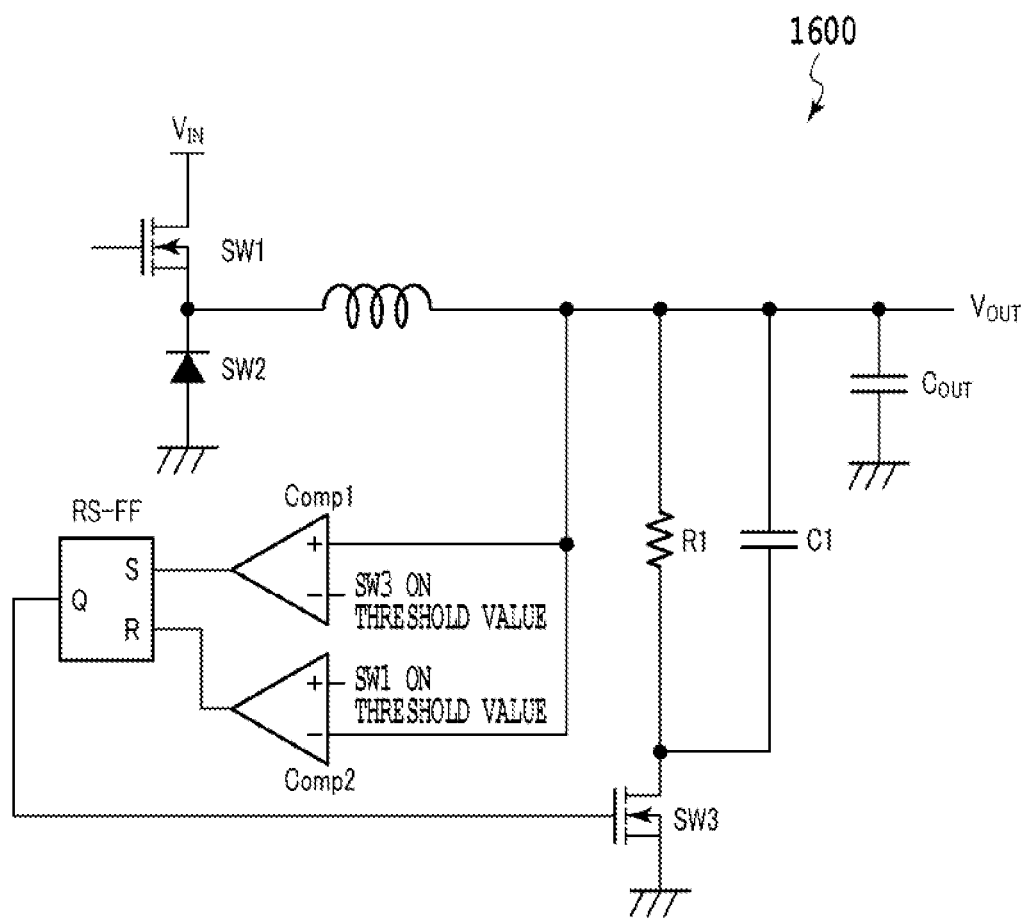
FIG. 16 is a diagram illustrating a power supply circuit according to an eighth embodiment.

An example control circuit used for a power supply circuit according to the present invention is shown in FIG. 16. For an explanation, the third embodiment shown in FIG. 8 is employed as an example; however, the control circuit can also be applied for all of the other embodiments.

The operation of the control circuit will be described by referring to the chart in FIG. 9. When the output voltage goes beyond the SW3 ON threshold value that is input to the inverting input terminal of a first comparator Comp1, an RS flip-flop has a set input, and a switching device SW3 is turned on. When the output voltage is dropped, and reaches the SW1 ON threshold value that is input to the non-inverting input terminal of a second comparator Comp2, a switching device SW1 is turned on, and at the same time, the switching device SW3 is turned off.

Ninth Embodiment

The power supply circuits in the first to the eighth embodiments have been described, as examples, as step-down type power supply circuits. However, the power supply circuit of the present invention is limited to a step-down type power supply circuit, and may be a step-up type power supply circuit.

Figure 17:
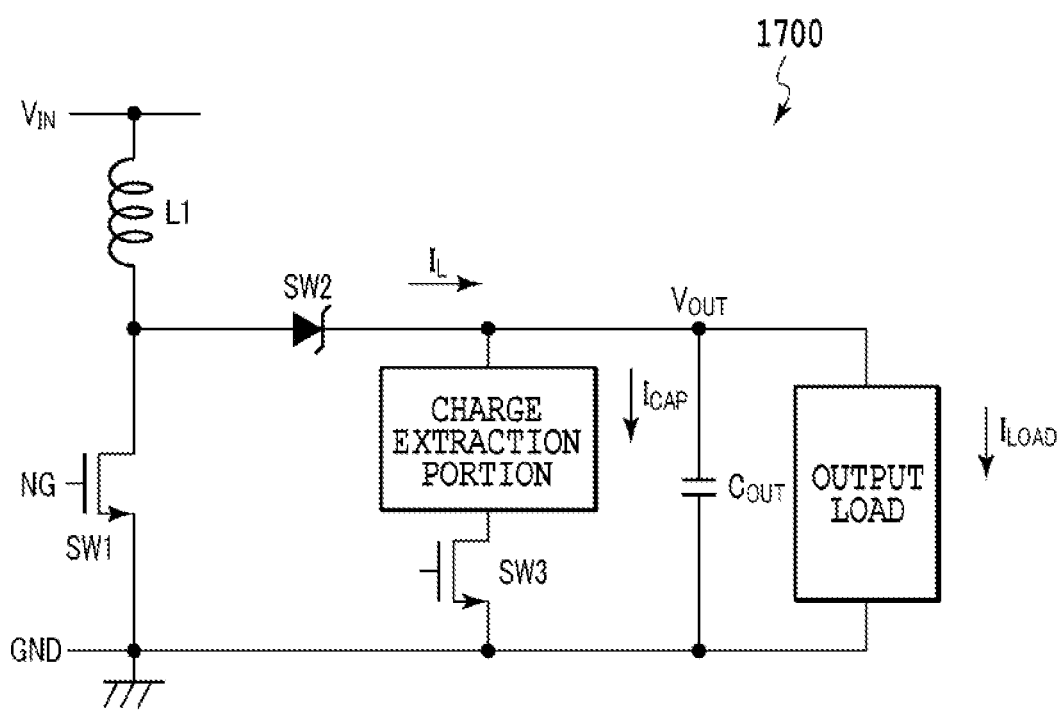
FIG. 17 is a diagram illustrating a power supply circuit according to a ninth embodiment.

A power supply circuit according to a ninth embodiment is shown in FIG. 17. A power supply circuit 1700 is a step-up type power supply circuit that includes: an inductor L1, one terminal of which is coupled to an input voltage terminal, to which an input voltage $V_{IN}$ is to be applied; a switching device SW1 coupled between the other terminal of the inductor L1 and a ground terminal; a switching device SW2 coupled between a junction point of the switching device SW1 and the inductor L1 and an output voltage terminal, from which an output voltage $V_{OUT}$ is to be output; a capacitor $C_{OUT}$ arranged between the output voltage terminal and the ground terminal GND; a charge extraction portion coupled to the inductor L1 and the output voltage terminal in parallel to the capacitor $C_{OUT}$; and a switching device SW3 for the charge extraction portion.

The switching device SW3 is turned on when overshoot that has occurred due to a sudden reduction of a load current is detected. Thus, a charge of the capacitor $C_{OUT}$ is extracted by the charge extraction portion to suppress the rising of the output voltage V.

The charge extraction portion may be coupled to either the input terminal side or the output terminal side of the switching device SW2 to perform charge extraction, without a current in the inductor being used to excessively charge the capacitor $C_{OUT}$.

Any of the structures explained in the first to the eighth embodiments can be employed for the arrangement of the charge extraction portion. Furthermore, the structure described in the eighth embodiment can be applied as a control circuit.

For the descriptions in the first to the ninth embodiments, a case wherein the switching device SW2 is a Zener diode has been employed; however, not only the Zener diode, but also a diode without a breakdown voltage, an MOS transistor or a bipolar transistor can be employed.

Furthermore, for the first to the ninth embodiments, the voltage conversion circuit includes the inductor L1, the switching device SW1 used to transmit the input voltage $V_{IN}$ to the inductor L1 and transmit a current to charge the inductor, and the switching device SW2 used to discharge, for the capacitor $C_{OUT}$, a current charged in the inductor; however, instead of such a switching regulator, a series regulator, such as an LDO, may be employed to provide the voltage conversion circuit.

REFERENCE SIGNS LIST 300, 400, 500, 800, 1000, 1100, 1200, 1300, 1400, 1600, 1700: power supply circuit
$V_{IN}$: input voltage
$V_{OUT}$: output voltage
SW1: switching device
SW2: switching device
SW3: switching device
SW4: switching device
SW5: switching device
SW6: switching device
GND: ground terminal
L1: inductor
R1: resistor
C1: capacitor
$C_{OUT}$: output capacitor
Comp1: first comparator
Comp2: second comparator
RS-FF: RS flip-flop

The invention claimed is:

1. A power supply circuit, comprising:
a voltage conversion circuit for outputting to an output voltage terminal an output voltage stepped up or down from an input voltage applied to an input voltage terminal;
an output capacitor coupled to the output voltage terminal; and
a charge extraction circuit for extracting a charge from the output capacitor,
wherein:
the charge extraction circuit comprises a first switching device between the output voltage terminal and a ground terminal,
the charge extraction circuit further comprises a charge extraction portion coupled in series to the first switching device between the output voltage terminal and the ground terminal,
the charge extraction portion extracts the charge from the output capacitor when the first switching device is turned on,
the charge extraction portion comprises a parallel circuit comprising the resistor and a capacitor coupled in parallel to the resistor,
the charge extraction portion further comprises a second switching device directly physically and directly electrically coupled in parallel to both terminals of the capacitor of the charge extraction portion, and
the second switching device is turned on when the first switching device is off.

2. A power supply circuit, comprising:
a voltage conversion circuit for outputting to an output voltage terminal an output voltage stepped up or down from an input voltage applied to an input voltage terminal;
an output capacitor coupled to the output voltage terminal; and
a charge extraction circuit for extracting a charge from the output capacitor,
wherein:
the charge extraction circuit comprises a first switching device between the output voltage terminal and a ground terminal,
the charge extraction circuit further comprises a charge extraction portion coupled in series to the first switching device between the output voltage terminal and the ground terminal,
the charge extraction portion extracts the charge from the output capacitor when the first switching device is turned on, and
the charge extraction portion comprises a parallel circuit comprising a second switching device and a capacitor directly physically and directly electrically coupled in parallel to both terminals of the second switching device, and
wherein the second switching device is turned on when the first switching device is off.

3. A power supply circuit, comprising:
a voltage conversion circuit for outputting to an output voltage terminal an output voltage stepped up or down from an input voltage applied to an input voltage terminal;
an output capacitor coupled to the output voltage terminal; and
a charge extraction circuit for extracting a charge from the output capacitor,
wherein:
the charge extraction circuit comprises a first switching device between the output voltage terminal and a ground terminal, and
the voltage conversion circuit comprises:
a series circuit comprising a third switching device and an inductor, wherein one terminal of the third switching device is coupled to the input voltage terminal, one terminal of the inductor is coupled to the output terminal, and the other terminal of the third switching device is directly physically and directly electrically coupled to the other terminal of the inductor; and
a fourth switching device, one terminal of which is coupled to a common junction point of the third switching device and the inductor; and
the common junction point is not directly connected to the output terminal and the charge extraction circuit;
a fifth switching device coupled between one terminal of the inductor and the output voltage terminal; and
a sixth switching device coupled between one terminal of the inductor and the input voltage terminal,
wherein the fifth switching device is turned off when the first switching device is on and the sixth switching device is turned on when the first switching device is on.

4. The power supply circuit according to claim 3, wherein the first switching device is turned on when a voltage of the output voltage terminal becomes equal to or higher than a predetermined threshold value while the third switching device is off, and is turned off when the third switching device is shifted from the off state to the on state.

5. A power supply circuit, comprising:
a voltage conversion circuit for outputting to an output voltage terminal an output voltage stepped up or down from an input voltage applied to an input voltage terminal;
an output capacitor coupled to the output voltage terminal; and
a charge extraction circuit for extracting a charge from the output capacitor, wherein:
the charge extraction circuit comprises a first switching device between the output voltage terminal and a ground terminal, and
the voltage conversion circuit comprises:
a series circuit comprising a third switching device and an inductor, wherein one terminal of the third switching device is coupled to the input voltage terminal, one terminal of the inductor is coupled to the output terminal, and the other terminal of the third switching device is directly physically and directly electrically coupled to the other terminal of the inductor; and
a fourth switching device, one terminal of which is coupled to a common junction point of the third switching device and the inductor; and
the common junction point is not directly connected to the output terminal and the charge extraction circuit;
a first comparator, a non-inverting input terminal of which the output voltage terminal is coupled to, wherein an ON threshold value for the first switching device is input to an inverting input terminal of the first comparator;
a second comparator, an inverting input terminal of which the output voltage terminal is coupled to, wherein an ON threshold value for the third switching device is input to a non-inverting input terminal of the second comparator; and
an RS flip-flop, an output terminal of which is coupled to the first switching device, wherein an output of the first comparator is input to a set terminal of the RS flip-flop and an output of the second comparator is input to a reset terminal of the RS flip-flop.

6. A power supply circuit, comprising:
a voltage conversion circuit for outputting to an output voltage terminal an output voltage stepped up or down from an input voltage applied to an input voltage terminal;
an output capacitor coupled to the output voltage terminal; and
a charge extraction circuit for extracting a charge from the output capacitor,
wherein:
the charge extraction circuit comprises a first switching device between the output voltage terminal and a ground terminal, and
the voltage conversion circuit comprises:
a series circuit comprising a third switching device and an inductor, wherein one terminal of the third switching device is coupled to the ground terminal, one terminal of the inductor is coupled to the input terminal, and the other terminal of the third switching device is directly physically and directly electrically coupled to the other terminal of the inductor; and
a fourth switching device, one terminal of which is coupled to a common junction point of the third switching device and the inductor; and
the common junction point is not directly connected to the output terminal and the charge extraction circuit;
a first comparator, a non-inverting input terminal of which the output voltage terminal is coupled to, wherein an ON threshold value for the first switching device is input to an inverting input terminal of the first comparator;
a second comparator, an inverting input terminal of which the output voltage terminal is coupled to, wherein an ON threshold value for the third switching device is input to a non-inverting input terminal of the second comparator; and
an RS flip-flop, an output terminal of which is coupled to the first switching device, wherein an output of the first comparator is input to a set terminal of the RS flip-flop and an output of the second comparator is input to a reset terminal of the RS flip-flop.

7. The power supply circuit according to claim 6, wherein the first switching device is turned on when a voltage of the output voltage terminal becomes equal to or higher than a predetermined threshold value while the third switching device is off, and is turned off when the third switching device is shifted from the off state to the on state.

* * * * *